United States Patent
Putnam et al.

(10) Patent No.: US 6,298,184 B1
(45) Date of Patent: Oct. 2, 2001

(54) METHOD AND APPARATUS FOR FORMING A TUBE-ENCASED BRAGG GRATING

(75) Inventors: Martin A. Putnam, Middletown, CT (US); Timothy J. Bailey, Longmeadow, MA (US); Matthew B. Miller, East Hartford, CT (US); James M. Sullivan, Manchester, CT (US); Mark R. Fernald, Enfield, CT (US); Michael A. Davis, Glastonbury, CT (US); Christopher J. Wright, Amston, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/205,845

(22) Filed: Dec. 4, 1998

(51) Int. Cl.$^7$ ........................................................ G02B 6/34
(52) U.S. Cl. .......................... 385/37; 385/10; 385/123; 385/24
(58) Field of Search ................................ 385/37, 10, 123, 385/24

(56) References Cited

U.S. PATENT DOCUMENTS

| | | | |
|---|---|---|---|
| 4,593,969 | 6/1986 | Goodman et al. | 350/96.19 |
| 4,636,031 | 1/1987 | Schmadel, Jr. et al. | 350/96.19 |
| 4,725,110 | 2/1988 | Glenn et al. | 350/3.61 |
| 4,915,467 | 4/1990 | Berkey | 350/96.15 |
| 5,007,705 | 4/1991 | Morey et al. | 350/96.29 |
| 5,042,898 | 8/1991 | Morey et al. | 385/37 |
| 5,136,677 | * 8/1992 | Drexhage et al. | 385/123 |

(List continued on next page.)

FOREIGN PATENT DOCUMENTS

| | | | |
|---|---|---|---|
| 0359351 | 9/1992 | (EP) | C03B/37/15 |
| 0 798577 | 10/1997 | (EP). | |
| 2 272075 | 5/1994 | (GB). | |

OTHER PUBLICATIONS

M.G. Xu, Geiger and J. P. Dakin for "Fibre grating pressure sensor with enhanced sensitivity using a glass–bubble housing"—Electronics Letters—Jan. 18, 1996 vol. 32, No. 2.

Quartzdyne, Inc., Series QU/QG Spec Specification Sheet and p. 6, Section 1, General Information taken from Quartzdyne Pressure Transducers (Series QU, QG, QL, TMC, 1XP and LP) Apr. 1, 1997.

"The Thickness–Shear Quartz Resonator: A Rugged, Precision Pressure Transducer" Product Feature from SENSORS, Jul. 1990.

*Primary Examiner*—Frank G. Font
*Assistant Examiner*—Roy M. Punnoose

(57) ABSTRACT

A method and apparatus for forming a tube-encased fiber grating includes an optical fiber 28 which is encased within and fused to at least a portion of a glass capillary tube 120 and a substantially transparent index-matching medium 122, such as an optically flat window, having an optically flat surface 126 adjacent to the tube 120. A substantially transparent index-matching intermediate material (e.g., UV transparent oil) 124 is used between the window 22 and the tube 120 to substantially eliminate the interface between the tube 120 and the medium 122. A pair of writing beams 26,34 are incident on and pass through the medium 122, the tube 120 and intersect and interfere in a region 30 on the fiber 28. Also, the width Wb of the writing beams 26,34 may be set to be less than the width Woil of the intermediate material 124 to eliminate surface damage (ablations) of the tube 120. Attentively, the medium 122 may have a geometry to eliminate surface ablations (e.g., a collar shape) and/or to match the shape of the tube 120. More than one grating or pair of gratings may be written in the tube-encased fiber or one or more gratings may be formed in multiple fibers 28,250 encased in the tube 120. Further, high intensity writing beams 26,34 on the fiber 28 may be achieved by having the medium 122 have a predetermined thickness T.

42 Claims, 4 Drawing Sheets

U.S. PATENT DOCUMENTS

| | | | |
|---|---|---|---|
| 5,235,659 | 8/1993 | Atkins et al. | 385/124 |
| 5,351,321 | 9/1994 | Snitzer et al. | 385/10 |
| 5,388,173 | 2/1995 | Glenn | 385/37 |
| 5,399,854 | 3/1995 | Dunphy et al. | 250/227.17 |
| 5,469,520 | 11/1995 | Morey et al. | 385/37 |
| 5,512,078 | 4/1996 | Griffin | 65/484 |
| 5,578,106 | 11/1996 | Fleming, Jr. et al. | 65/391 |
| 5,682,453 | 10/1997 | Daniel et al. | 385/99 |
| 5,684,297 | 11/1997 | Cable | 250/227.14 |
| 5,691,999 | 11/1997 | Ball et al. | 373/20 |
| 5,745,626 | 4/1998 | Duck et al. | 385/96 |
| 5,790,726 | 8/1998 | Ito et al. | 385/37 |
| 5,841,131 | 11/1998 | Schroeder et al. | 250/227.17 |
| 6,075,625 * | 6/2000 | Ainslie et al. | 385/37 |
| 6,097,512 * | 8/2000 | Ainslie et al. | 385/37 |

* cited by examiner

US 6,298,184 B1

METHOD AND APPARATUS FOR FORMING A TUBE-ENCASED BRAGG GRATING

CROSS REFERENCES TO RELATED APPLICATIONS

Copending U.S. patent applications, Ser. No. 09/399,404 (now abandoned), entitled "Tube-Encased Fiber Grating Pressure Sensor", Ser. No. 09/399,495 (now abandoned) entitled "Tube-Encased Fiber Grating", Ser. No. 09/400,364 (now abandoned), entitled "Tube-Encased Fiber Grating Temperature Sensor", Ser. No. 09/205,846 (now abandoned), entitled "Tube-Encased Compression-Tuned Fiber Grating", and Ser. No. 09/206,171, entitled "Method and Apparatus For Forming A Bragg Grating With High Intensity Light" all filed contemporaneously herewith, contain subject matter related to that disclosed herein.

TECHNICAL FIELD

This invention relates to fiber Bragg gratings, and more particularly to forming a tube-encased Bragg grating.

BACKGROUND ART

It is known in the art of fiber optics that Bragg gratings (i.e., periodic or aperiodic variations in the refractive index of the optical fiber) exhibit a predetermined wavelength reflection profile. As is known, a fiber Bragg grating is the result of a photo-refractive effect. In particular, when the core of a photosensitive (e.g., germania-doped) optical fiber is exposed to ultra-violet radiation in a predetermined wavelength range, a permanent change in the refractive index is produced. The magnitude of the refractive index change is related to the intensity of the incident radiation and the time of exposure.

As is also known, a Bragg grating is impressed (or embedded or written or imprinted) into the core of an optical fiber by allowing two coherent nominally plane optical waves to interfere within the fiber core at a location along the fiber where the grating is desired. The resulting interference pattern is a standing wave which exists along the longitudinal axis of the fiber having an intensity variation which causes a corresponding spatially periodic or aperiodic variation in refractive index along the longitudinal axis of the fiber. For periodic variations, the grating has a peak reflection wavelength related to twice the spatial period (or grating spacing). The spatial periodicity or other spatial variations of the refractive index of the fiber, and the resultant reflectivity profile, are a function of the wavelength, amplitude, and/or phase of the two incident writing beams and/or their angle of intersection within the fiber.

The above described techniques are described in U.S. Pat. Nos. 4,807,950 and 4,725,110, entitled "Method for Impressing Gratings Within Fiber Optics", both to Glenn et al and U.S. Pat. No. 5,388,173, entitled "Method and Apparatus for Forming Aperiodic Gratings in Optical Fibers", to Glenn, which are hereby incorporated by reference.

It is also known that Bragg gratings embedded in the fiber may be used for parameter sensing or for wavelength filtering or tuning applications. Furthermore, a tube-encased grating (i.e., a grating in an optical fiber, where the grating and fiber are encased within and fused to at least a portion of a glass tube), may be used in numerous applications, such as is discussed in commonly-owned, co-pending U.S. patent applications, Ser. No. 09/399,404 (now abandoned), entitled "Tube-Encased Fiber Grating Pressure Sensor", Ser. No. 09/400,364 (now abandoned), entitled "Tube-Encased Fiber Grating Temperature Sensor", and Ser. No. 09/205,846 (now abandoned), entitled "Tube-Encased Compression-Tuned Fiber Grating", all filed contemporaneously herewith. In those cases, the fiber is encased in the tube by heating the tube and heating and fusing the tube to the fiber, as is described in commonly-owned copendng U.S. patent applications Ser. No. 09/399,495 (now abandoned), entitled "Tube-Encased Fiber Grating". When such a tube-encased grating is used, it may be desirable to write the grating into the optical fiber after it is encased in the tube, for ease of manufacturability, or to avoid having the grating affected by the heating and fusing process, or for other reasons.

SUMMARY OF THE INVENTION

Objects of the present invention include provision of a method and apparatus for writing a Bragg grating into an optical waveguide encased in a tube.

According to the present invention, an apparatus for impressing a grating in an tube-encased optical waveguide, comprises a photosensitive optical waveguide; a tube, having the optical waveguide encased therein along a longitudinal axis of the tube, the tube being fused to at least a portion of the waveguide; an interface medium, disposed adjacent to the tube; an intermediate material disposed between the medium and the tube; means for providing a pair of writing beams having a predetermined wavelength capable of writing a Bragg grating in the waveguide; the writing beams being incident on a surface of and passing through a portion of the interface medium, the intermediate material, and the tube, and the beams intersecting and interfering at a predetermined region of the waveguide; and the surface of the interface medium being optically flat.

According further to the present invention, the intermediate material is substantially transparent to the wavelength of the writing beams. According further to the present invention, the intermediate material has a refractive index that substantially matches the refractive index of the tube and the interface medium. According further to the present invention, the intermediate material comprises an oil. According further to the present invention, a beam width of the writing beams is no greater than a dimension of the intermediate material.

According to a second aspect of the present invention, a method for making a tube-encased Bragg grating, comprises the steps of obtaining a tube, having a photosensitive optical waveguide encased therein along a longitudinal axis of the tube, the tube being fused to at least a portion of the waveguide; placing an interface medium adjacent to the tube; placing an intermediate material between the medium and the tube; simultaneously exposing the waveguide, the tube, the intermediate material and the interface medium to two writing beams having a predetermined wavelength, the beams intersecting and interfering at a predetermined region of the waveguide so as to write a Bragg grating in the waveguide, the writing beams passing through the interface medium the intermediate material and the tube; and the surface of the interface medium having being optically flat.

According further to the second aspect of the present invention, the intermediate material is substantially transparent to the wavelength of the writing beams. According further to the second aspect of the present invention, the intermediate material has a refractive index that substantially matches the refractive index of the tube and the interface medium. According further to the second aspect of the present invention, a beam width of the writing beams is no greater than a dimension of the intermediate material.

The present invention provides a method and apparatus for writing a Bragg grating through a tube into an optical fiber which is encased in and fused to at least a portion of a capillary tube. The tube may be made of a glass material for encasing a glass fiber. Also, the tube may be fused to the grating area and/or on opposite axial sides of the grating area. The invention allows the grating to be written into the fiber through the tube after the tube is heated and fused to the fiber for ease of manufacturability, or to avoid having the grating affected by the heating and fusing process, or for other reasons. If desired, the tube-encased fiber may be hydrogen loaded prior to writing the grating to provide higher reflectivity and/or faster writing time.

The foregoing and other objects, features and advantages of the present invention will become more apparent in light of the following detailed description of exemplary embodiments thereof.

BEST MODE FOR CARRYING OUT THE INVENTION

Figure 1:
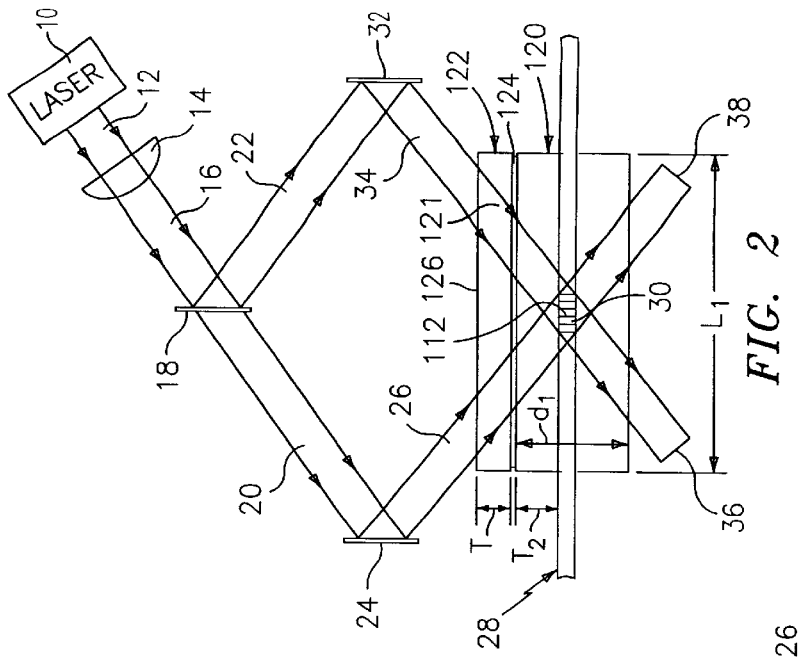
FIG. 1 is a front view block diagram of a prior art configuration for writing a grating in an optical fiber.

Referring to FIG. 1, a prior art configuration for writing a Bragg grating 40 in an optical fiber 28 comprises a laser source 10 (e.g., a pulsed or continuous wave laser) which provides a source beam 12 having a wavelength in the Ultra-Violet (UV) range (e.g., about 193 to 330 nanometers) which is incident on a cylindrical lens 14 which provides a beam 16. The beam 16 is incident on a beamsplitter 18 which passes a predetermined percentage (e.g., 50%) of the input light 16 as a passed light 20 and reflects the remaining portion as a reflected light 22. The passed light 20 is incident on a mirror 24 which provides a reflected writing beam 26. The writing beam 26 is incident on a region 30 of a photosensitive optical fiber 28, e.g., a germania-doped silica-core fiber. The reflected beam 22 is incident on a mirror 32 which provides a reflected writing beam 34. The writing beam 34 is also incident on the region 30 of the optical fiber 28. The beams 26,34 intersect and interfere in the region 30 of the fiber 28 to form a standing wave interference pattern along the longitudinal axis of the fiber 28 in the region 30 having a predetermined intensity variation which causes a corresponding permanent variation in refractive index of the core of the fiber 28 (i.e., a Bragg grating 40), as described hereinbefore and in the aforementioned U.S. Pat. Nos. 4,807,950, 4,725,110, and 5,388,173. Other techniques and equipment may be used to create the two coherent writing beams 26,34.

For periodic variations, the grating 40 has a peak reflection wavelength related to twice the spatial period (or grating spacing). The spatial periodicity or other spatial variations of the refractive index of the fiber 28, and the resultant reflectivity profile, are a function of the wavelength, amplitude (or intensity), and/or phase of the two incident beams 26,34 and/or their angle of intersection within the fiber 28.

The fiber 28 may be any optical fiber or waveguide that is photosensitive and guides propagating light, e.g., a single mode, germania-doped silica core fiber having an outer cladding 62 diameter of about 125 microns and a core 60 outer diameter of about 9 microns. Other materials and dimensions for the optical fiber or waveguide 10 may be used if desired. For example, the fiber 28 may be made of any glass, e.g., silica, phosphate glass, or other glasses, or made of glass and plastic, or solely plastic. Also, the fiber 28 may have an outer diameter of 80 microns or other diameters.

Further, instead of an optical fiber, any optical waveguide may be used that is photosensitive (i.e., a waveguide made of a material that has a refractive index that can be changed by exposure to light of a predetermined wavelength at a predetermined intensity). Also, a multi-mode, birefringent, polarization maintaining, polarizing, multi-core, or multi-ladding optical waveguide, or a flat or planar waveguide (where the waveguide is rectangular shaped), or other optical waveguide may be used if desired. As used herein the term "fiber" includes the above described waveguides.

The optional cylindrical lens 14 is used to focus the beams 16,20,26 to a line 36 and the beams 16,22,34 to a line 38.

Figure 2:
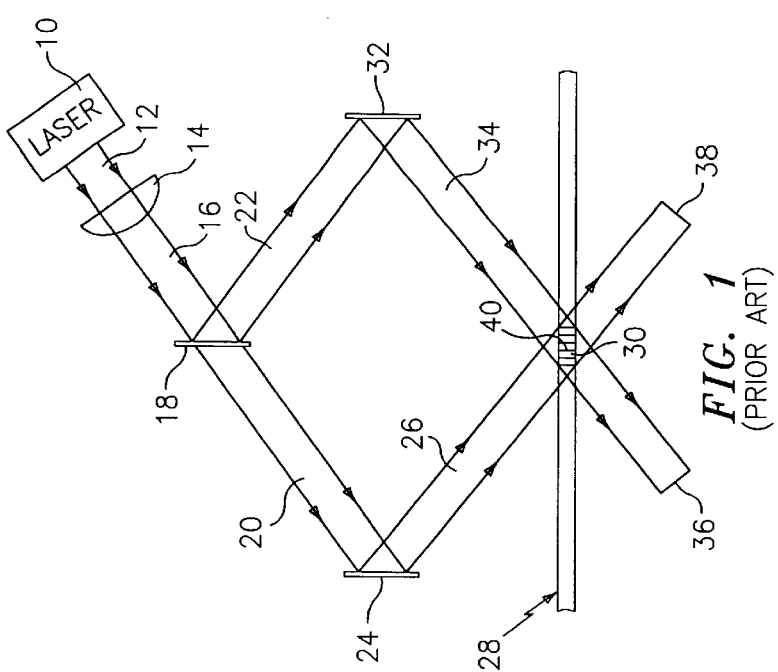
FIG. 2 is a front view block diagram of a configuration for writing a grating in a tube-encased optical fiber, in accordance with the present invention.

Referring to FIG. 2 of the present invention, the optical fiber 28 is encased within and fused to at least a portion of a glass cylindrical capillary tube 120. The tube 120 may be encased and fused to the fiber 28 in a manner such as that described in the aforementioned copending U.S. patent application, Ser. No. 09/399,495 (now abandoned), or by other techniques such as those described in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or by other techniques.

The tube 120 may have an outer diameter d1 of about 3 mm and a length L1 of about 10 mm. The length of the grating 112 to be written may be about 5 mm. Alternatively, the length L1 of the tube 120 may be substantially the same length as the length of the grating 112, such as by the use of a longer grating, or a shorter tube. Other dimensions and lengths for the tube 120 and the grating 112 may be used. Also, the tube 20 may have cross-sectional shapes other than circular, such as square, rectangular, elliptical, clam-shell, or other shapes, and may have side-view sectional shapes other than rectangular, such as circular, square, elliptical, clam-shell, or other shapes. Also, the fiber 28 need not be fused in the center of the tube 120 but may be fused anywhere in the tube 120. Also, the tube 120 need not be fused to the fiber 10 over the entire length of the tube 120. Further, the fiber 28 and/or grating 112 may be oriented in any desired direction on the tube 120, e.g., longitudinally, transversely (or radially), circumferentially, angled, curved, or other orientations. Also, the fiber 28 may be encased in the tube 120 having an initial pre-strain on the fiber 28 (compression or tension) or no pre-strain.

The tube 120 is made of a glass material that is substantially transparent to the wavelength of the writing beams 26,34, such as natural or synthetic quartz, fused silica, silica ($SiO_2$), Pyrex® by Corning (boro silicate), or Vycor® by Corning (about 95% silica and 5% other constituents such as Boron Oxide), or other glasses. Other glasses or materials that are substantially transparent to the wavelength of the writing beams 26,34 may be used for the tube 120. The amount of transparency (or optical attenuation) of the tube 120 is determined by the thickness T and the material properties of the tube 120. The acceptable amount of transparency is determined by the amount of optical attenuation that can be tolerated for a given application. The tube 120 also may have a refractive index that substantially matches that of the fiber 28. It is not required for the tube 120 to be index-matching; however, if it is not, the angle of the writing beams 26,34 would change at they pass from the tube 120 to the fiber 28 and would need to be accounted for in the grating writing procedure.

Instead of the tube 120 being made of a glass material, other materials may be used provided the tube 120 (or the inner surface of a bore hole in the tube 120) can be fused to (i.e., create a molecular bond with, or melt together with) the outer surface (or cladding) of the optical fiber 28 such that the interface surface between the inner diameter of the tube 120 and the outer diameter of the fiber 28 become substantially eliminated (i.e., the inner diameter of the tube 20 cannot be distinguished from and becomes part of the cladding of the fiber 10).

Instead of the tube 20 being made of a glass material, other materials may be used provided the tube 20 can be fused to the fiber 10. For example, for an optical fiber made of plastic, a tube made of a plastic material may be used.

To encase the fiber 28 within the tube 120, the tube 120 maybe heated and fused to the grating 112 as discussed in the aforementioned copending U.S. patent application, Ser. No. 09/399,495 (now abandoned), entitled "Tube-Encased Fiber Grating", which is incorporated herein by reference. Other techniques may be used for collapsing and fusing the tubes 20 to the fiber 10, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques.

Figure 3:
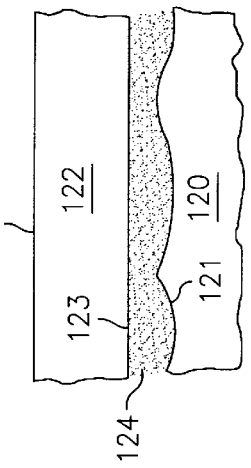
FIG. 3 is a blown-up diagram of a portion of FIG. 2, in accordance with the present invention.
Figure 4:
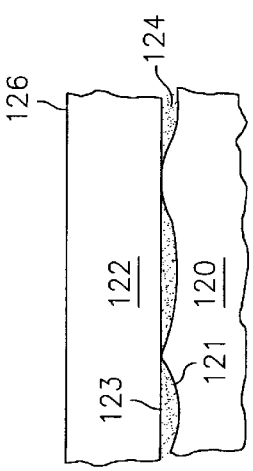
FIG. 4 is a blown-up diagram of a portion of FIG. 2 in an alternative arrangement, in accordance with the present invention.

Referring to FIGS. 3,4, when conventional grating writing techniques discussed hereinbefore are used to write the grating 112 through the tube 120, the upper surface 121 of the tube 120 (along the longitudinal axis of the tube) may not be optically flat enough to allow the grating 112 to be written, due to manufacturing imperfections (e.g., the heating and fusing process, mechanical grinding, etching, laser machining, polishing, etc.), or due to other causes. As a result, minor variations (on a wavelength scale) in the contour of upper surface 121 of the tube 120 where the writing beams are incident may cause different portions (or rays) of the writing beams 26,34 to either not interfere along the core of the fiber or to interfere at different incident angles along the core, thereby producing an inconsistent, unpredictable, or undesired grating characteristics (e.g., reflection wavelength, grating reflectivity, or other characteristics).

To alleviate this problem, the present invention provides an optically flat interface medium 122 which is adjacent to and may be in contact with the tube 120. More specifically, the medium 122 has optically flat upper surface 126 (that the writing beams 26,34 are incident on) and is made of a material that is substantially transparent to the wavelength of the writing beams 26,34 (e.g., Ultra Violet (UV) light), such as silica $SiO_2$ (e.g., fused silica, synthetic fused silica, fused quartz, synthetic quartz) or the like, such as an optically flat window, Part No. PW-0643-UV made by CVI Corp. Other glasses or materials that are substantially transparent to the wavelength of the writing beams 26,34 may be used for the medium 122. The medium 122 has a length L of about 0.5 to 2.0 cm, a thickness T of about 1 mm and a width Wm (side view) of about 1 cm (FIG. 3). Other dimensions for the medium 122 may be used.

As discussed hereinbefore with the tube 120, the amount of transparency (or optical attenuation) of the medium 122 is determined by the thickness T and the material properties of the medium 122. The acceptable amount of transparency is determined by the amount of optical attenuation that can be tolerated for a given application.

The medium 122 also may have a refractive index that substantially matches that of the tube 120. It is not required for the medium 122 to be index-matching; however, if it is not index-matching, the angle of the writing beams 26,34 would change at they pass from the medium 122 to the tube 120 and would need to be accounted for in the grating writing procedure.

The medium 122 maybe in contact with the surface 121 of the tube 120 as shown in FIG. 3, or separated by a distance as shown in FIG. 4. Also, the lower (tube side) surface 123 of the medium 122 need not be optically flat (discussed more hereinafter).

Also, an intermediate material 124 is disposed between and in contact with the medium 122 and the tube 120 and fills any air gaps between the medium 122 and the tube 120. The intermediate material 124 is substantially transparent to the wavelength of the writing beams 26,34 and has a refractive index that substantially matches that of the tube 120 and the medium 122, such as a UV transparent index-matching oil or gel, such as an oil by Cargile, Part No. 50350, or a soft UV polymer, such as Teflon® AF, by Dupont. Thus, the material 124 makes the interface between the medium 122 and the tube 120 substantially transparent to the writing beams 26,34. Also, as discussed hereinbefore, the amount of transparency is determined by the amount of optical attenuation that can be tolerated for a given application.

Also, it is not required that the refractive index (or index) of the intermediate material 124 match the index of the medium 122 or the index of the tube 120. However, the rougher the surface of the tube 120, the closer the index of the intermediate material 124 should match the index of the tube 120. If the bottom surface 123 of the medium 122 is optically flat, the index of the medium 122 need not match the index of the intermediate material 124 or the tube 120. However, if the bottom surface 123 of the medium 122 is not optically flat, the index of the medium 122, the intermediate material 124, and the tube 120 should substantially match each other. In that case, as discussed hereinbefore with the tube 120, the amount of index-matching needed depends on the roughness of either of the two surfaces 121,123, i.e., the rougher the surface 121 or the surface 123, the closer the index-matching is required to be.

Figure 5:
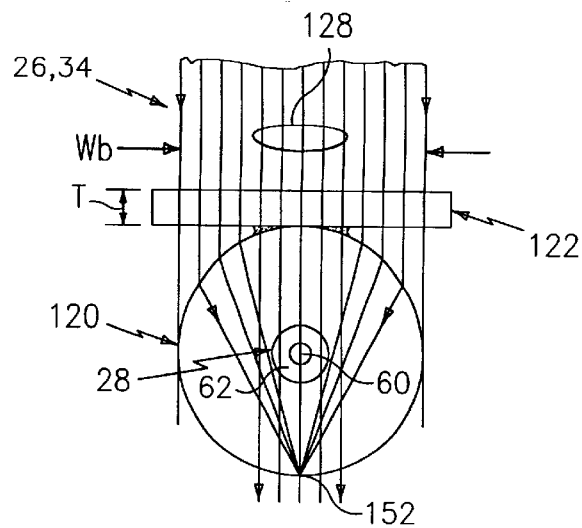
FIG. 5 is a side view of a portion of FIG. 1 with a wide writing beam, in accordance with the present invention.
Figure 6:
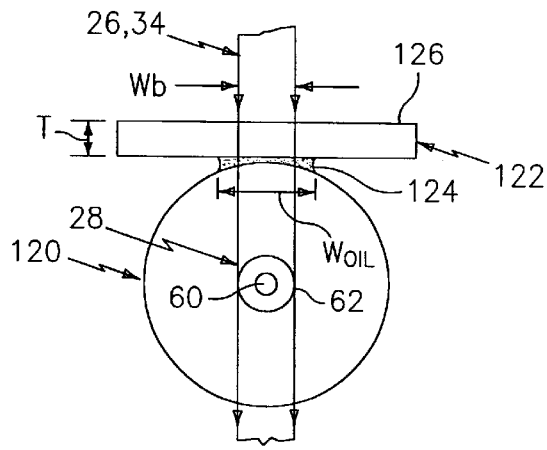
FIG. 6 is a side view of a portion of FIG. 1 having a narrow writing beam, in accordance with the present invention.

Referring to FIGS. 5 and 6, we have also found that when the side view width Wb of the beams 26,34 are substantially as wide as the tube 120 diameter, the rays of the beams 26,34 outside of the group of rays 128 axe refracted through the curved surface of the tube 120 and focus to a small region 152 on the lower (or back) surface of the tube 120. In that case, the intensity of the light at the focus region 152 is so high that the electric field strength causes surface damage to the tube 120 in the form of ablations (i.e., melting, evaporation, or particle discharge) at or near the focus region 152. For example, we have seen such refractive effect cause ablations at the focus region 152 with a single 20 nsec pulse at a wavelength of 248 nm and the intensity of light at the upper surface of the tube 120 below the maximum intensity for glass, which indicates (based on the severity of surface damage) that the intensity of light at the focus region 152 was at least about 1–2 Joules/cm$^2$.

Referring to FIG. 4, we have found that when the width Wb of the beams 26,34 are set to be less than the width Woil of the intermediate material 124 (e.g., transparent index-matching oil), no ablations of the tube 120 occur.

Figure 7:
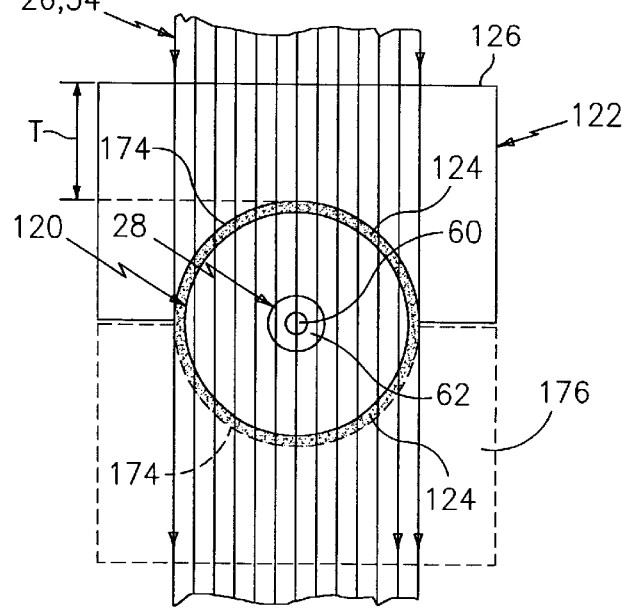
FIG. 7 is a side view of a portion of FIG. 1 having a collar-shaped interface medium, in accordance with the present invention.

Referring to FIG. 7, alternatively, instead of reducing the width Wb of the beams 26,34, the side view of the medium 122 may have a collar-shape having the optically flat upper surface 126 and a semicircular curve 174 in the lower surface. The curved surface 174 may substantially match the geometry of the tube 120 and the curved surface 174 may be in contact with the outer diameter of the tube 120. Alternatively, the intermediate material 124 may be used to fill any air gaps between the curved surface 174 and the tube 120. In this embodiment, light rays of the beams 26,34 pass straight through the collar shaped medium 122 and the tube 120 without forming a focal point within the tube 120. Alternatively, a lower section 176 having the curved section 174 which matches the outer geometry of the tube 120 may be used in a clam-shell arrangement with the medium 122. Also, the medium 122 may include the lower section 176 as a single piece with a hole comprising the curved sections 174 where the tube 120 is slid in.

Figure 8:
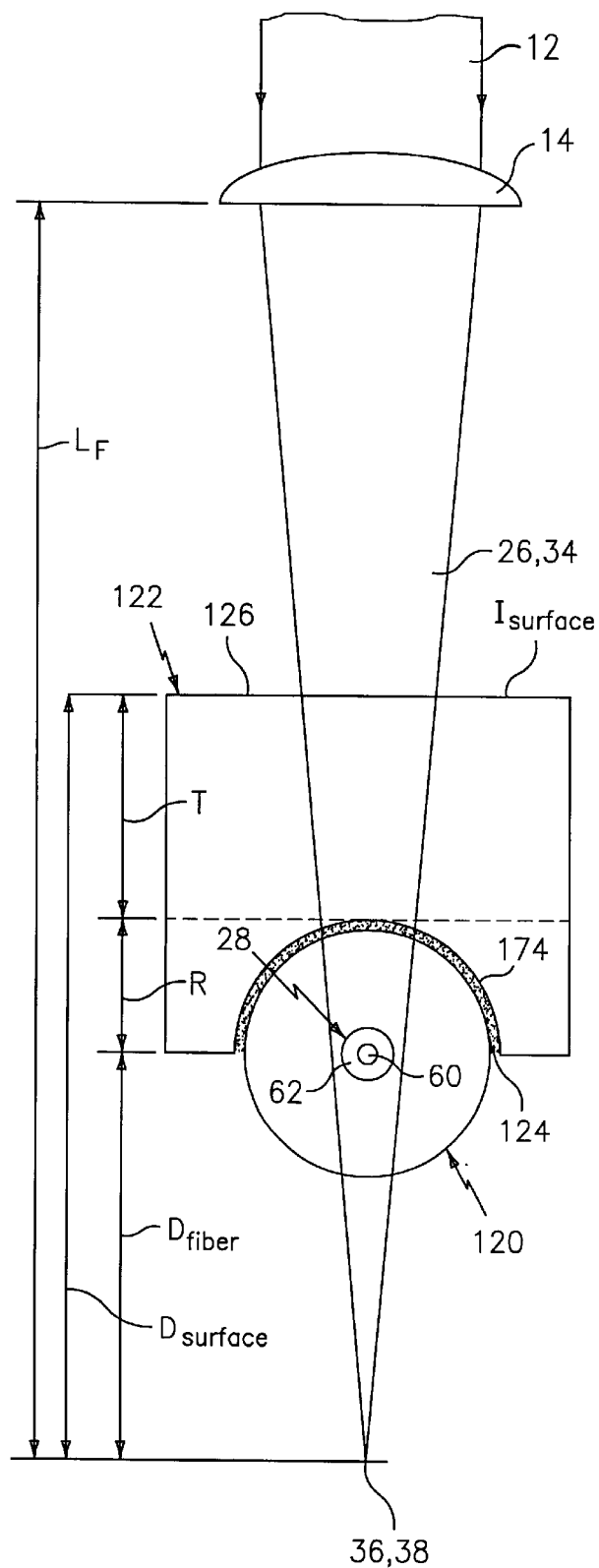
FIG. 8 is a side view of an alternative embodiment of FIG. 1 where a light beam is focussed on an optical fiber, in accordance with the present invention.

Referring to FIG. 8, if the cylindrical focusing lens 14 is used, the writing beams 26,34 would focus to the lines 36,38 as discussed hereinbefore. To allow for a high intensity interference pattern, and thus a high reflectivity grating, the writing beams 26,34 can be focused on or near the fiber 28. However, in that case, the intensity of the electric field at the air-to-glass interface would be so large that ablations of the surface of the glass would occur. We have found that if the medium 122 has a large enough thickness T between the air-to-glass interface 126 and upper surface of the tube 120, the intensity Isurface of the writing beams 26,34 at the air-to-glass interface 126 is low enough to avoid albations at the interface surface 126, such as is described in commonly owned copending U.S. patent application, Ser. No. 09/206,171, entitled "Method and Apparatus for Fonning a Bragg Grating With High Intensity Light", filed contemporaneously herewith, and which is incorporated herein by reference.

In particular, the thickness T of the medium 122 is determined by the focal length Lf of the lens 14, the intensity of the input beam 12, and the desired intensity Ifiber of the beams 26,34 at the fiber 28 and the desired intensity Isurface of the beams 26,34 at the air-to-glass interface 126.

In general, the equation for the intensity $I_D$ of a focussed beam at a given distance D from the focal point is as follows:

$$I_D = I1 * Lf / D \qquad \text{Eq. 1}$$

where Lf is the focal length of the lens; I1 is the laser intensity (energy/area) of the input beam on a focussing lens, D is an arbitrary distance from the focal point and $I_D$ is the intensity of the focussed beam at the location D along the focussed beam.

Rearranging Eq. 1 gives the distance D from the focal point of the beam where a given intensity $I_D$ exists, as follows:

$$D = I1 * Lf / I_D \qquad \text{Eq. 2}$$

Thus, the distance Dfiber from the focal points (or lines) 36,38 to the center of the fiber 28 for a given desired intensity Ifiber of the beams 26,34 at the fiber 28 and the distance Dsurface from the focal point 36,38 to the air-to-glass surface 126 for a given desired intensity Isurface of the beams 26,34 at the air-to-glass interface 126 can be determined as follows:

$$D\text{fiber} = I1 * Lf / I\text{fiber} \qquad \text{Eq. 3}$$

$$D\text{surface} = I1 * Lf / I\text{surface} \qquad \text{Eq. 4}$$

Accordingly, the thickness T of the medium 122 from the upper surface of the fiber 28 to the air-to-glass interface surface 126 can then be determined by the relation:

$$T = D\text{surface} - D\text{fiber} - R \qquad \text{Eq. 5}$$

where R is the radius of the fiber 28 which is small (about 63 microns) plus the radius of the tube 120 (e.g., about 1.5 mm) plus thickness of the intermediate material 124.

An example of a high intensity grating exposure of an optical fiber is to have a minimum beam intensity Ifiber in the fiber 28 of about 800 mJ/cm$^2$. Also, an example of the maximum allowable intensity Isurface at the air-to-glass interface 56 to avoid surface damage is about 600 mJ/cm$^2$ (depending on the surface quality of the glass). Other intensities may be used if desired.

Thus, for a laser with an input power I1 to the lens 14 of 300 mJ/cm$^2$, a focal length Lf of 50 cm, and Ifiber=800 mj/cm$^2$ and Isurface=600 mJ/cm$^2$, the distance Dfiber from the focal point 36,38 to the center of the fiber 28, and the distance Dsurface from the focal point 36,38 to the air-to-glass surface 126 can be determined from Eqs. 4,5 as follows:

$$D\text{fiber} = 300*50/800 = 18.7 \text{ cm}$$

$$D\text{surface} = 300*50/600 = 25 \text{ cm}$$

The thickness T of the medium 122 is determined from Eq. 5 as follows:

$$T = 25 - 18.7 - 0.15 = 6.15 \text{ cm}$$

Figure 9:
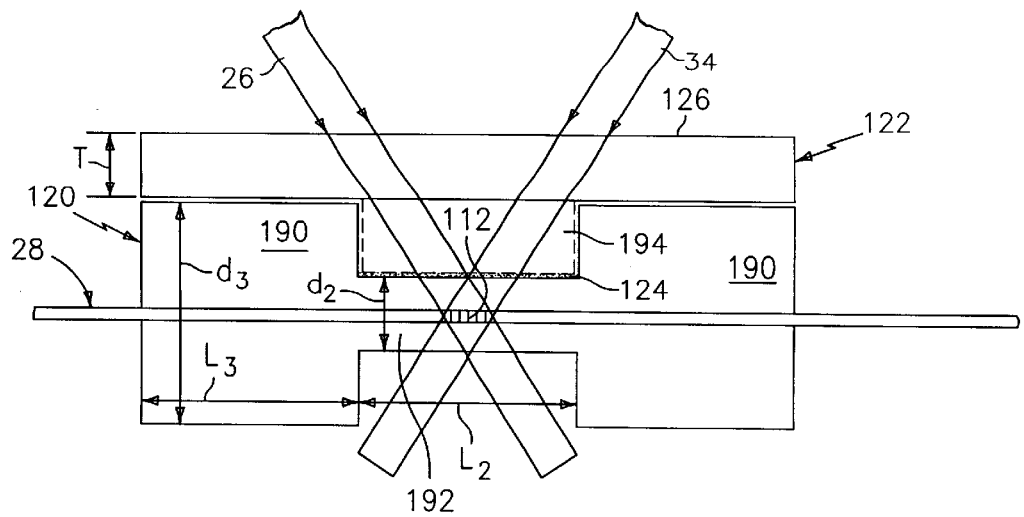
FIG. 9 is a diagram of a portion of FIG. 1 where the tube has an alternative geometry, in accordance with the present invention.

Referring to FIG. 9, the capillary tube 120 may have a varying geometry, depending on the application. For example, the tube 120 may have a "dogbone" shape having a narrow central section 192 and larger outer sections 190, such as is discussed in the aforementioned commonly-owned copending U.S. patent application, Ser. No. 09/399, 495 (now abandoned). The narrow section 192 has a diameter d2 of about 2 mm (0.079 in.), and a length L2 of about 12 mm (0.472 in.). The large sections 190 have a diameter d3 of about 4 mm (0.157 in.) and a length L3 of about 6.35 mm (0.25 inches). Other lengths and diameters of the sections 190,192 may be used. Also, the tube 120 may have other geometries, such as is discussed in the aforementioned copending U.S. patent application, Ser. No. 09/399,495 (now abandoned).

In that case, the medium 122 may have a protruding section 194 that fits into and contacts with the narrow section 192. Attentively, the intermediate material 124 may be used to fill any air gaps between the section 124 and the section 194. Alternatively, instead of having the protruding section 194, the legion between the medium 122 and the narrow section 192 may be filled with the material 124 discussed hereinbefore.

Figure 10:
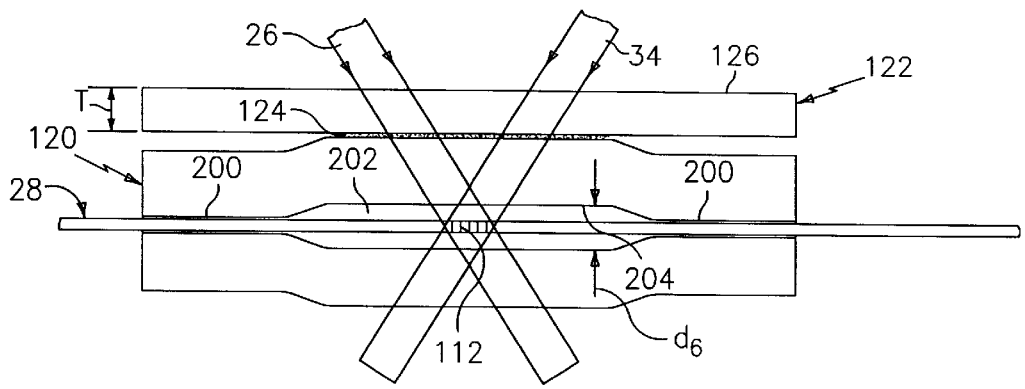
FIG. 10 is a diagram of a portion of FIG. 1 where the tube is fused to the fiber on opposite axial ends of the grating, in accordance with the present invention.

Referring to FIG. 10, alternatively, the tube 120 may be fused to the fiber 28 on opposite axial sides of the grating 112 such as is discussed in the aforementioned U.S. patent application, Ser. No. 09/205,944 (now abandoned). In that case, regions 200 of the tube 120 are fused to the fiber 28 and a central section 202 of the tube 120 around the grating 112 is not fused to the fiber 28. In that case, the region 202 around the grating 112 is filled with air and the upper inner surface 204 of the tube 120 is optically flat. Alternatively, instead of the surface 204 being optically flat, the region 202 may be filled with a substantially transparent index-matching adhesive, e.g., epoxy, or other filling material, e.g., a polymer, silicone, oil, or another material (such as those discussed hereinbefore for the intermediate material 124). The inner diameter d6 of the tube 120 may be small (e.g., about 0.01 to 10 microns larger than the diameter of the optical fiber 28 or 125.01 to 135 microns) or may be much larger if desired.

Figure 11:
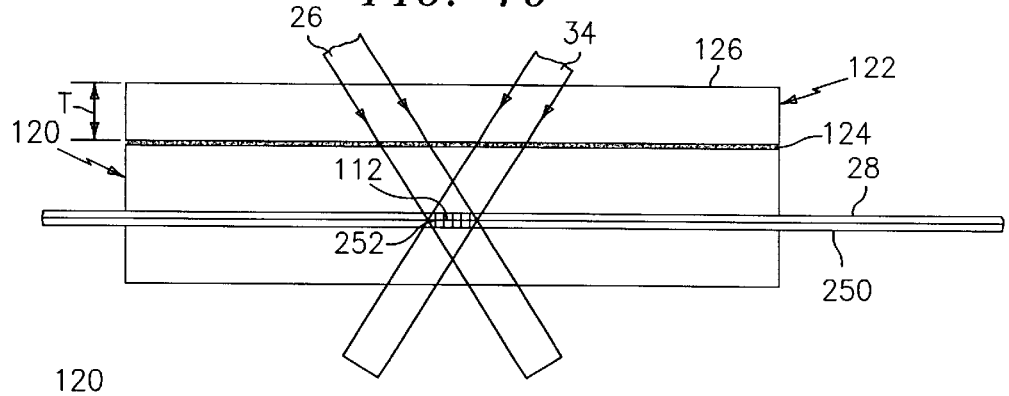
FIG. 11 is a diagram of a portion of FIG. 1 where a configuration for writing a grating through a tube having multiple fibers encased in the tube, in accordance with the present invention.
Figure 12:
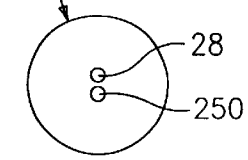
FIG. 12 is an end view of FIG. 11, in accordance with the present invention.
Figure 13:
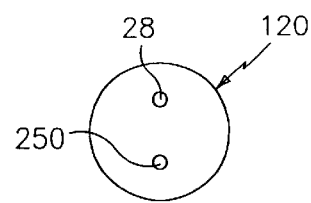
FIG. 13 is an end view of FIG. 11 with the fibers spaced apart, in accordance with the present invention.

Referring to FIGS. 11, 12, alternatively, two or more fibers 28,250, each having at least one grating 112,252 therein, respectively, may be encased within the tube 120. In that case, the bore hole in the tube 120 prior to heating and fusing the tube 120 would be large enough to contain both fibers 28,250 and may be other than circular, e.g., square, triangle, etc. Also, the fibers 28,250 need not be centered along the center line of the tube 120. Referring to FIG. 13, alternatively, instead of the fibers 28,250 touching each other as shown in FIG. 11, the fibers 28,250 may be spaced apart in the tube 120 by a predetermined distance. The distance may be any desired distance between the fibers 28,250 and have any orientation within the outer diameter of the tube 120. It should be understood that more than one grating may be written in the fiber 28 in the tube 120.

Further, for any of the embodiments shown herein, instead of the fiber 28 passing through the tube 120, the fiber 28 may be single-ended, i.e., only one end of the fiber 28 exits the tube 120. In that case, one end of the fiber 28 would be at or prior to the exit point of the fiber 28 from the tube 120. Also, the term "tube" as used herein may also mean a block of material having the properties described herein.

If desired, the tube-encased fiber 120 may be hydrogen loaded prior to writing the grating to provide higher reflectivity and/or faster writing time, such as is grating 112 is not fused to the fiber 28. In that case, the region 202 around the grating discussed in U.S. Pat. No. 5,235,659, entitled "Method of Making An Article Comprising An Optical Fiber", to Atkins et al. Alternatively, the fiber 28 may have a high photosensitivity, e.g., high germanium doping of the fiber core, to provide a similar effect. However, neither hydrogen loading nor highly photosensitive fiber is required to write the grating 112 in the fiber 28 through the tube 120 with the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An apparatus for impressing a grating in an tube-encased optical waveguide, comprising:

a photosensitive optical waveguide;

a tube, having said optical waveguide encased therein along a longitudinal axis of said tube, said tube being fused to at least a portion of said waveguide;

an interface medium, disposed adjacent to said tube;

an intermediate material disposed between said medium and said tube;

means for providing a pair of writing beams having a predetermined wavelength capable of writing a Bragg grating in said waveguide;

said writing beams being incident on a surface of and passing through a portion of said interface medium, said intermediate material, and said tube, and said beams intersecting and interfering at a predetermined region of said waveguide; and said surface of said interface medium being optically flat.

2. The apparatus of claim 1 wherein said intermediate material is substantially transparent to said wavelength of said writing beams.

3. The apparatus of claim 1 wherein said intermediate material has a refractive index that substantially matches the refractive index of said tube and said interface medium.

4. The apparatus of claim 1 wherein said intermediate material comprises an oil.

5. The apparatus of claim 1 wherein said intermediate material comprises a polymer.

6. The apparatus of claim 1 wherein a beam width of said writing beams is no greater than a dimension of said intermediate material.

7. The apparatus of claim 1 wherein said medium comprises an optically flat window.

8. The apparatus of claim 1 wherein said waveguide comprises an optical fiber.

9. The apparatus of claim 1 wherein said wavelength of said beams is in the ultraviolet range.

10. The apparatus of claim 1 wherein said writing beams are focussed beams and have an intensity at said fiber of greater than a predetermined high intensity and said medium has a predetermined thickness such that the intensity of said writing beams at said surface of said medium of less than a predetermined surface damage intensity.

11. The apparatus of claim 10 wherein said high intensity is about 500 mjoules/cm$^2$.

12. The apparatus of claim 1 wherein said tube is fused to said optical fiber where said grating is to be written.

13. The apparatus of claim 1 wherein said tube is fused to said optical fiber on opposite axial sides of where said grating is to be written.

14. The apparatus of claim 1 wherein said tube has a dogbone shape.

15. A tube-encased Bragg grating, made by a process comprising the steps of:

obtaining a tube, having a photosensitive optical waveguide encased therein along a longitudinal axis of said tube, said tube being fused to at least a portion of said waveguide;

placing an interface medium adjacent to said tube;

placing an intermediate material between said medium and said tube simultaneously exposing said waveguide, said tube, said intermediate material and said interface medium to two writing beams having a predetermined wavelength, said beams intersecting and interfering at a predetermined region of the waveguide so as to write a Bragg grating in said waveguide, said writing beams passing through said interface medium said intermediate material and said tube; and said surface of said interface medium having being optically flat.

16. The product by process of claim 15 wherein said intermediate material is substantially transparent to said wavelength of said writing beams.

17. The product by process of claim 15 wherein said intermediate material has a refractive index that substantially matches the refractive index of said tube and said interface medium.

18. The product by process of claim 15 wherein said intermediate material comprises an oil.

19. The product by process of claim 15 wherein said intermediate material comprises a polymer.

20. The product by process of claim 15 wherein a beam width of said writing beams is no greater than a dimension of said intermediate material.

21. The product by process of claim 15 wherein said medium comprises an optically flat window.

22. The product by process of claim 15 wherein said waveguide comprises an optical fiber.

23. The product by process of claim 15 wherein said wavelength of said beams is in the ultraviolet range.

24. The product by process of claim 15 wherein said writing beams are focussed beams and have an intensity at said fiber of greater than a predetermined high intensity and said medium has a predetermined thickness such that the intensity of said writing beams at said surface of said medium of less than a predetermined surface damage intensity.

25. The product by process of claim 15 wherein said high intensity is about 500 mjoules/cm$^2$.

26. The product by process of claim 15 wherein said tube is fused to said optical fiber where said grating is to be written.

27. The product by process of claim 15 wherein said tube is fused to said optical fiber on opposite axial sides of where said grating is to be written.

28. The product by process of claim 15 wherein said tube has a dogbone shape.

29. A method for making a tube-encased Bragg grating, comprising the steps of:

obtaining a tube, having a photosensitive optical waveguide encased therein along a longitudinal axis of said tube, said tube being fused to at least a portion of said waveguide;

placing an interface medium adjacent to said tube;

placing an intermediate material between said medium and said tube simultaneously exposing said waveguide, said tube, said intermediate material and said interface medium to two writing beams having a predetermined wavelength, said beams intersecting and interfering at a predetermined region of the waveguide so as to write a Bragg grating in said waveguide, said writing beams passing through said interface medium said intermediate material and said tube; and said surface of said interface medium having being optically flat.

30. The process of claim 29 wherein said intermediate material is substantially transparent to said wavelength of said writing beams.

31. The process of claim 29 wherein said intermediate material has a refractive index that substantially matches the refractive index of said tube and said interface medium.

32. The process of claim 29 wherein said intermediate material comprises an oil.

33. The process of claim 29 wherein said intermediate material comprises a polymer.

34. The process of claim 29 wherein a beam width of said writing beams is no greater than a dimension of said intermediate material.

35. The process of claim 29 wherein said medium comprises an optically flat window.

36. The process of claim 29 wherein said waveguide comprises an optical fiber.

37. The process of claim 29 wherein said wavelength of said beams is in the ultraviolet range.

38. The process of claim 29 wherein said writing beams are focussed beams and have an intensity at said fiber of greater than a predetermined high intensity and said medium has a predetermined thickness such that the intensity of said writing beams at said surface of said medium of less than a predetermined surface damage intensity.

39. The process of claim 29 wherein said high intensity is about 500 mjoules/cm$^2$.

40. The process of claim 29 wherein said tube is fused to said optical fiber where said grating is to be written.

41. The process of claim 29 wherein said tube is fused to said optical fiber on opposite axial sides of where said grating is to be written.

42. The process of claim 29 wherein said tube has a dogbone shape.

* * * * *